(12) United States Patent
Lee et al.

(10) Patent No.: US 8,690,212 B2
(45) Date of Patent: Apr. 8, 2014

(54) ROBOT HAND

(75) Inventors: Youn Baek Lee, Suwon-si (KR); Yong Jae Kim, Seoul (KR); Jeong Hun Kim, Suwon-si (KR); Heum Yong Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 13 days.

(21) Appl. No.: 13/282,729

(22) Filed: Oct. 27, 2011

(65) Prior Publication Data

US 2012/0112485 A1 May 10, 2012

(30) Foreign Application Priority Data

Nov. 5, 2010 (KR) .................. 10-2010-0109911

(51) Int. Cl.
*B25J 15/00* (2006.01)
*B66C 1/00* (2006.01)

(52) U.S. Cl.
USPC ............. 294/111; 294/115; 294/116; 623/64; 901/38; 901/39

(58) Field of Classification Search
USPC ............ 294/106, 111, 907, 115, 116; 901/30, 901/31, 38, 39; 414/2–5, 7; 623/62, 64; 74/490.04, 490.06, 490.01, 490.03, 74/490.05, 490.21, 421 A, 421 R
See application file for complete search history.

(56) References Cited

U.S. PATENT DOCUMENTS

| | | | | |
|---|---|---|---|---|
| 4,946,380 A | * | 8/1990 | Lee | 623/24 |
| 4,955,918 A | * | 9/1990 | Lee | 623/24 |
| 5,378,033 A | * | 1/1995 | Guo et al. | 294/116 |
| 5,437,490 A | * | 8/1995 | Mimura et al. | 294/106 |
| 6,669,257 B2 | * | 12/2003 | Laliberte et al. | 294/106 |
| 7,168,748 B2 | * | 1/2007 | Townsend et al. | 294/106 |

* cited by examiner

*Primary Examiner* — Stephen Vu
(74) *Attorney, Agent, or Firm* — Staas & Halsey LLP

(57) ABSTRACT

Embodiments are directed to a robot hand including a frame, a link member moving relative to the frame, a joint unit provided between the frame and the link member, a drive unit supplying power to the joint unit so as to rotate the link member, and a backlash removal unit supplying constant torque to the joint unit, even if a relative position of the link member to the frame is changed as the link member is rotated.

17 Claims, 10 Drawing Sheets

ROBOT HAND

CROSS-REFERENCE TO RELATED APPLICATIONS

This application claims the benefit of Korean Patent Application No. 2010-0109911, filed on Nov. 5, 2010 in the Korean Intellectual Property Office, the disclosure of which is incorporated herein by reference.

BACKGROUND

1. Field

Embodiments relate to a robot hand in which fingers are accurately controlled.

2. Description of the Related Art

Joints of one finger of a robot hand include a metacarpophalangeal (MP) joint between a palm and a first link, a proximal interphalangeal (PIP) joint between the first link and a middle link, and a distal interphalangeal (DIP) joint between the middle link and a final link. The MP point has 2 degrees of freedom, and the PIP joint and the DIP joint are moved in a connected state and thus generally have only 1 degree of freedom. Therefore, the finger has a total of 3 degrees of freedom and is capable of moving a fingertip to a certain position in a space.

The robot hand is generally driven according to two methods. In one method, drive motors are disposed at the outside of the robot hand and transmit driving force to the robot hand through cables. Further, in the other hand, drive motors are disposed at finger joints and transmit driving force to the robot hand through gears. Particularly, if the robot hand is driven using the gears, backlash generated by the gears needs to be eliminated so as to accurately measure drive torque and to control force of the finger.

SUMMARY

Therefore, it is an aspect of an embodiment to provide a robot hand in which a movable angle of a finger is increased.

It is another aspect of an embodiment to provide a robot hand in which actual torque of a finger joint is accurately measured.

Additional aspects of embodiments will be set forth in part in the description which follows and, in part, will be obvious from the description, or may be learned by practice of the embodiments.

In accordance with an aspect of an embodiment, a robot hand includes a frame, a first link member moving relative to the frame, a second link member moving relative to the first link member, a first joint unit provided between the frame and the first link member, a first drive unit supplying power to the first joint unit so as to move the first link member relative to the frame, a second joint unit provided between the first link member and the second link member, a power transmission unit connecting the first joint unit and the second joint unit, and a backlash removal unit supplying constant torque to the first joint unit and supplying constant torque to the second joint unit, even if relative positions of the first link member and the second link member to the frame are changed as the first link member and the second link member are rotated by the first drive unit.

The backlash removal unit may include a cable provided with a first end fixed to the second link member and a second end located on the frame, a tension supply unit connected to the second end of the cable to supply constant tension to the cable, a first contact pulley enabling a first part of the cable to contact the first joint unit, and a second contact pulley enabling a second part of the cable to contact the second joint unit.

The first joint unit may include a first rotary shaft, a first gear part provided on the first rotary shaft, and a first pulley provided on the first rotary shaft such that the first part of the cable contacts the first pulley. The second joint unit may include a second rotary shaft, a third gear part provided on the second rotary shaft, and a second pulley provided on the second rotary shaft such that the second part of the cable contacts the second pulley.

The first drive unit may include a first drive motor and a first drive gear receiving power from the first drive motor and the first drive gear may be engaged with the first gear part.

The power transmission unit may include a first connection gear and a second connection gear engaged with each other, the first connection gear may be engaged with the first gear part, and the second connection gear may be engaged with the third gear part.

The first drive unit may further include a first sensor part to measure current supplied to the first drive motor.

The tension supply unit may include a static load spring.

The robot hand may further include a second drive unit supplying power to the first joint unit so as to move the first link member relative to the frame.

The first joint unit may include a first rotary shaft and a third gear part provided on the first rotary shaft.

The second joint unit may include a second drive motor and a second drive gear receiving power from the second drive motor and the second drive gear may be engaged with the third gear part.

The second drive unit may further include a second sensor part to measure current supplied to the second drive motor.

In accordance with another aspect of an embodiment, a robot hand includes a frame, a link member moving relative to the frame, a joint unit provided between the frame and the link member, a drive unit supplying power to the joint unit so as to rotate the link member, and a backlash removal unit supplying constant torque to the joint unit, even if a relative position of the link member to the frame is changed as the link member is rotated.

The backlash removal unit may include a cable provided with a first end fixed to the link member and a second end located on the frame, a tension supply unit connected to the second end of the cable to supply tension, and a contact pulley enabling at least a part of the cable to contact the joint unit.

The joint unit may include a rotary shaft, a gear part provided on the rotary shaft, and a pulley provided on the rotary shaft such that the at least a part of the cable contacts the pulley.

The drive unit may include a drive motor and a drive gear receiving power from the drive motor and the drive gear may be engaged with the gear part.

The drive unit may further include a sensor part to measure current supplied to the drive motor.

The tension supply unit may include a static load spring.

BRIEF DESCRIPTION OF THE DRAWINGS

These and/or other aspects of embodiments will become apparent and more readily appreciated from the following description of embodiments, taken in conjunction with the accompanying drawings of which.

DETAILED DESCRIPTION

Figure 1:
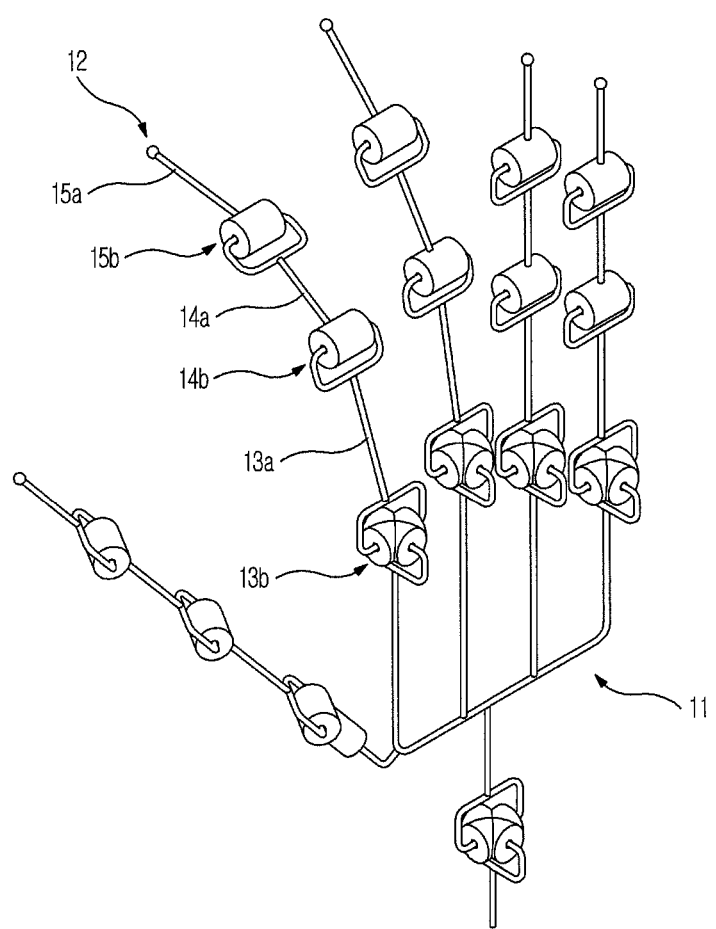
FIG. 1 is a schematic view illustrating main components of a robot hand in accordance with an embodiment.

Reference will now be made in detail to embodiments, examples of which are illustrated in the accompanying drawings, wherein like reference numerals refer to like elements throughout.

Hereinafter, a robot hand in accordance with an embodiment will be described in detail with reference to the accompanying drawings.

FIG. 1 is a schematic view illustrating main components of a robot hand in accordance with an embodiment.

As shown in FIG. 1, a robot hand 10 in accordance with an embodiment includes a palm 11 and fingers 12. Each of the fingers 12 includes an MP joint 13b between the palm 11 and a first link 13a, a PIP joint 14b between the first link 13a and a middle link 14a, and a DIP joint 15b between the middle link 14a and a final link 15a.

The MP joint 13b has 2 degrees of freedom, and the PIP joint 14b and the DIP joint 15b are moved in a connected state and thus generally have only 1 degree of freedom. Therefore, each of the fingers 12 has a total of 3 degrees of freedom and is capable of moving a fingertip to a certain position in a space.

The fingers 12 have the same structure, and thus only one finger 12 will be described hereinafter. Further, for convenience of description, the finger 12 including the MP joint 13b and the PIP joint 14b will be exemplarily described.

Figure 2:
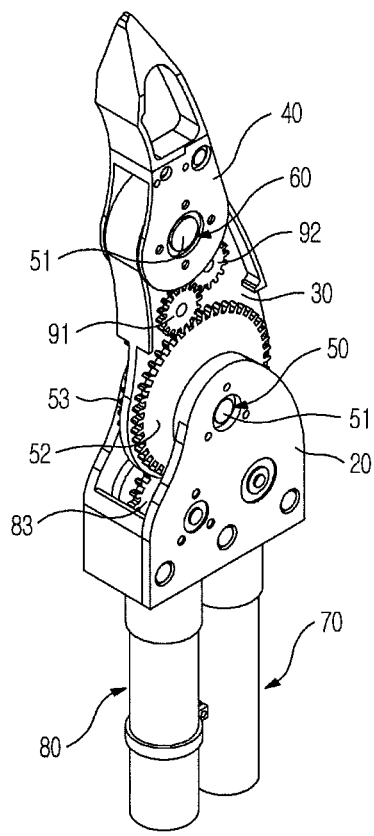
FIG. 2 is a front perspective view of a finger in accordance with an embodiment.
Figure 3:
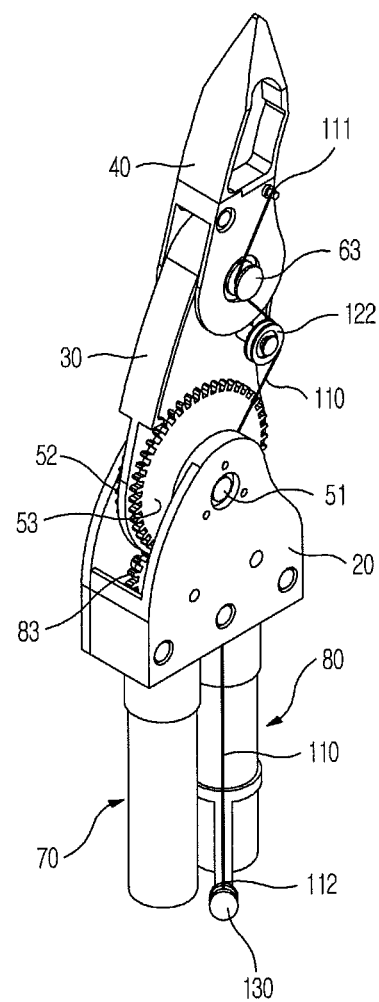
FIG. 3 is a rear perspective view of the finger in accordance with an embodiment.
Figure 4:
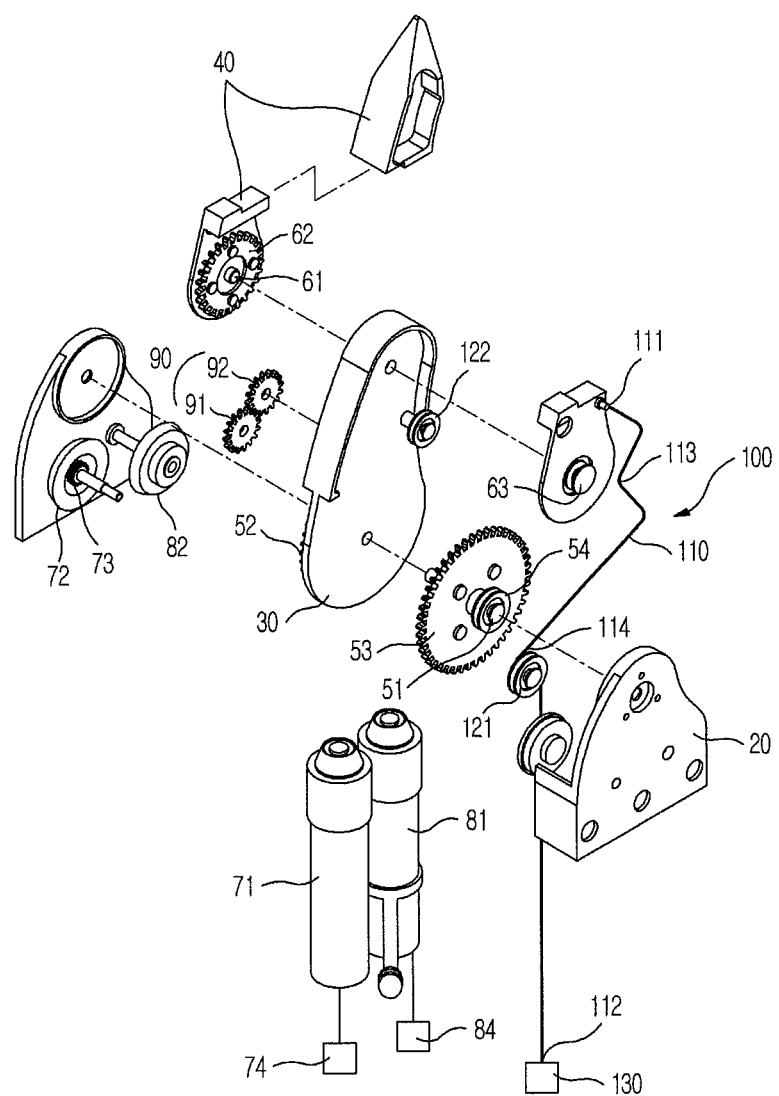
FIG. 4 is an exploded perspective view of the finger in accordance with an embodiment.

FIG. 2 is a front perspective view of a finger in accordance with an embodiment, FIG. 3 is a rear perspective view of the finger in accordance with an embodiment, and FIG. 4 is an exploded perspective view of the finger in accordance with an embodiment.

As shown in FIGS. 1 to 4, the robot hand 10 includes a frame 20, a first link member 30, a second link member 40, a first joint unit 50, a second joint unit 60, a first drive unit 70, a second drive unit 80, a power transmission unit 90 and a backlash removal unit 100.

The frame 20 corresponds to the palm 11 of the robot hand 10. The first drive unit 70 and the second drive unit 80 are installed on the lower portion of the frame 20. The first drive unit 70 includes a first drive motor 71, a first drive gear 73 receiving power from the first drive motor 71, and a first sensor part 74 to sense current supplied to the first drive motor 71. The second drive unit 80 includes a includes a second drive motor 81, a second drive gear 83 receiving power from the second drive motor 81, and a second sensor part 84 to sense current supplied to the second drive motor 81. Here, a first bevel gear 72 is provided between the first drive motor 71 and the first drive gear 73, and a second bevel gear 82 is provided between the second drive motor 81 and the second drive gear 83.

The first joint unit 50 is provided on the upper portion of the frame 20. The first joint unit 50 includes a first rotary shaft 51, a first gear part 52, a second gear part 53 and a first pulley 54. Here, the first joint unit 50 corresponds to the MP joint 13b of the robot hand 10.

The first rotary shaft 51 serves to rotatably fix the first link member 30 to the frame 20. The first link member 30 is rotated about the first rotary shaft 51 relative to the frame 20. As the first link member 30 is rotated, the relative position of the first link member 30 to the frame 20 is varied.

The first gear part 52 is provided on the first rotary shaft 51 so as to be rotated together with the first rotary shaft 51 and is engaged with the first drive gear 73. The second gear part 53 is provided on the first rotary shaft 51 so as to be rotated together with the first rotary shaft 51 and is engaged with the second drive gear 83. The first drive motor 71 transmits power to the first drive gear 73 through the first bevel gear 72. Thereafter, while the first gear part 52 is rotated, the first link member 30 is rotated about the first rotary shaft 51. On the other hand, the second drive motor 81 transmits power to the second drive gear 83 through the second bevel gear 82. Thereafter, while the second gear part 53 is rotated, the first link member 30 is rotated about the first rotary shaft 51.

The first pulley 54 is provided on the first rotary shaft 51, and a cable 110 contacts the first pulley 54. On the other hand, in accordance with another embodiment, the cable 110 may be wound on the first pulley 54.

The second joint unit 60 is provided on the upper portion of the first link member 30. The second joint unit 60 includes a second rotary shaft 61, a third gear part 62 and a second pulley 63. Here, the second joint unit 60 corresponds to the PIP joint 14b of the robot hand 10.

The second rotary shaft 61 serves to rotatably fix the second link member 40 to the first link member 30. The second link member 40 is rotated about the second rotary shaft 61 relative to the frame 20. As the second link member 40 is rotated, the relative position of the second link member 40 to the frame 20 and the first link member 30 is varied.

The third gear part 62 is provided on the second rotary shaft 61 so as to be rotated together with the second rotary shaft 61 and is connected with the first gear part 52 of the first joint unit 50 by a first connection gear 91 and a second connection gear 92 of the power transmission unit 90. In more detail, the first gear part 52 is engaged with the first connection gear 91, the first connection gear 91 is engaged with the second connection gear 92, and the second connection gear 92 is engaged with the third gear part 62. The first drive motor 71 transmits power to the first drive gear 73 through the first bevel gear 72. Thereafter, while the first gear part 52 is rotated, the first link member 30 is rotated about the first rotary shaft 51. Simultaneously, the first gear part 52 transmits power to the third gear part 62 through the first connection gear 91 and the second connection gear 92. While the third gear part 62 is rotated, the second link member 40 is rotated about the second rotary shaft 61.

The second pulley 63 is provided on the second rotary shaft 61, and the cable 110 contacts the second pulley 63. On the other hand, in accordance with another embodiment, the cable 110 may be wound on the second pulley 63.

The backlash removal unit 100 includes the cable 110, a tension supply unit 130, a first contact pulley 121 and a second contact pulley 122.

A first end 111 of the cable 110 is fixed to the second link member 40. A second end 112 of the cable 110 is located below the frame 20 and fixed to the tension supply unit 130. The tension supply unit 130 supplies constant tension to the cable 110 even if the length of the cable 110 is changed. For example, the tension supply unit 130 may include a static load spring. Accordingly, the second link member 40 is pulled toward the frame 20 by tension of the cable 110.

The cable 110 passes by the first pulley 54 of the first joint unit 50 while contacting the first pulley 54. The first contact pulley 121 formed on the frame 20 causes a first part 113 of the cable 110 to contact the first pulley 54 of the first joint unit 50 at all times. Therefore, a distance from the first rotary shaft 51 to the first part 113 of the cable 110 contacting the first pulley 54 is uniformly maintained at all times. That is, such a distance is substantially equal to the radius R1 of the first pulley 54.

Further, the cable 110 passes by the second pulley 63 of the second joint unit 60 while contacting the second pulley 63. The second contact pulley 122 formed on the first link member 30 causes a second part 114 of the cable 110 to contact the second pulley 63 of the second joint unit 60 at all times. Therefore, a distance from the second rotary shaft 61 to the second part 114 of the cable 110 contacting the second pulley 63 is uniformly maintained at all times. That is, such a distance is substantially equal to the radius R2 of the second pulley 63.

On the other hand, in accordance with another embodiment, the radius R1 of the first pulley 54 and the radius of the second pulley 63 may be equal.

Figure 5:
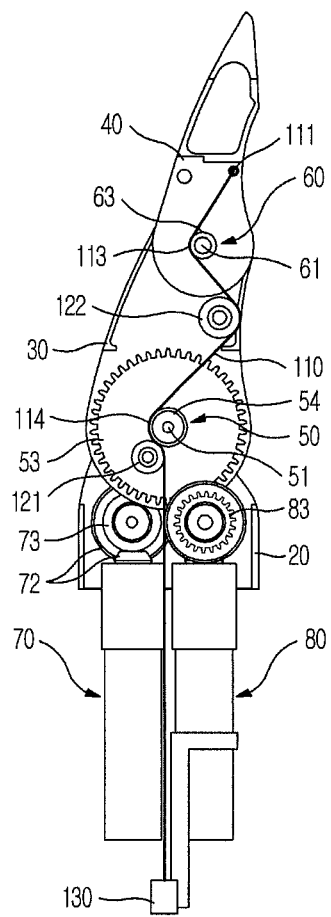
FIG. 5 is a view illustrating an operation of the robot hand in accordance with an embodiment.
Figure 6:
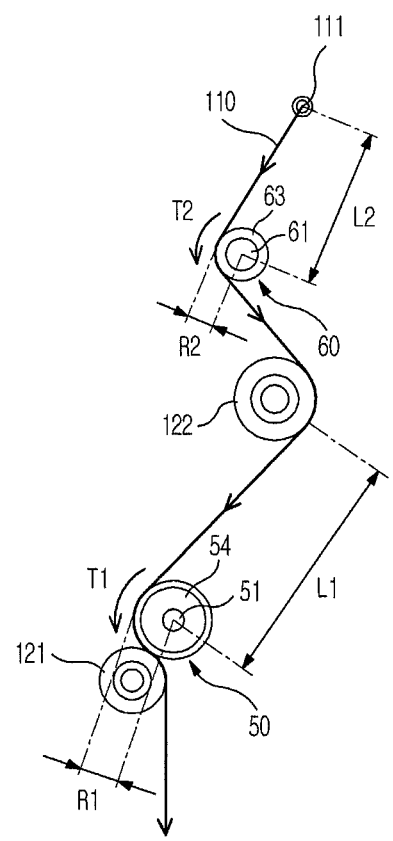
FIG. 6 is a view schematically illustrating torque at first and second joint units of FIG. 5.
Figure 7:
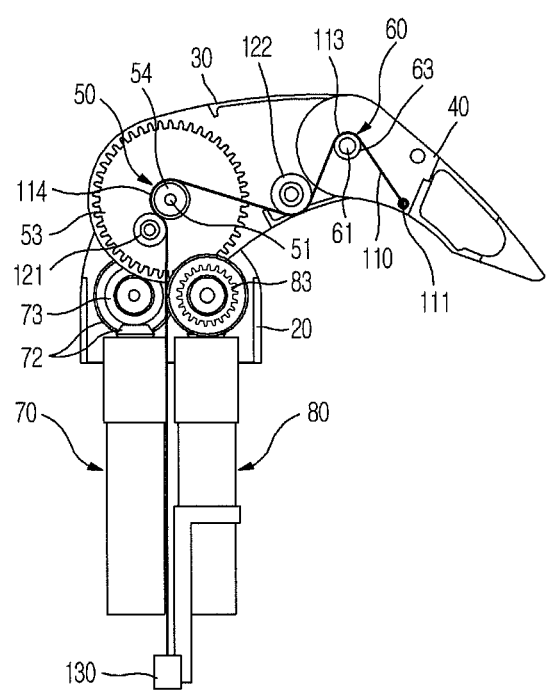
FIG. 7 is a view illustrating a rightward bending operation of the finger of the robot hand in accordance with an embodiment.
Figure 8:
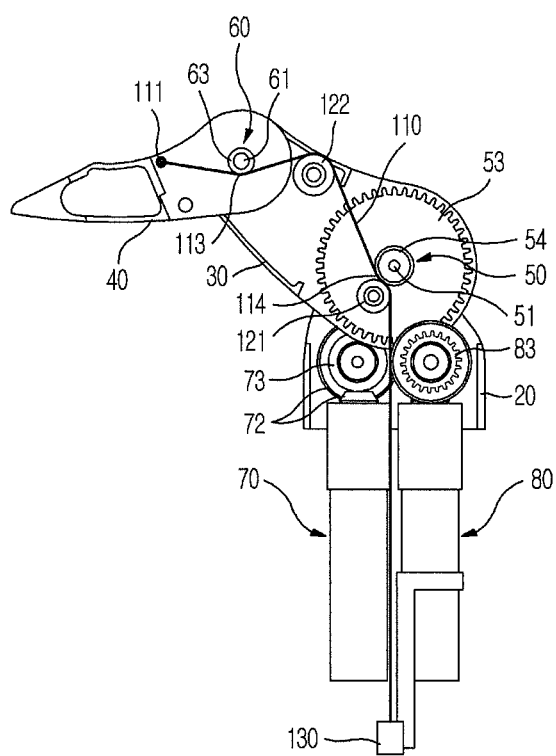
FIG. 8 is a view illustrating a leftward bending operation of the finger of the robot hand in accordance with an embodiment.

FIG. 5 is a view illustrating an operation of the robot hand in accordance with an embodiment, FIG. 6 is a view schematically illustrating torque at first and second joint units of FIG. 5, FIG. 7 is a view illustrating a rightward bending operation of the finger of the robot hand in accordance with an embodiment, and FIG. 8 is a view illustrating a leftward bending operation of the finger of the robot hand in accordance with an embodiment.

As shown in FIGS. 5 to 8, the first link member 30 and the second link member 40 of the robot hand 10 are completely outstretched. In this state, the tension supply unit 130 supplies constant tension T to the cable 110. The cable 110 continuously supplies force to pull the second link member 40 toward the frame 20.

Particularly, even if the state of FIG. 5 is changed to the state of FIG. 7 or 8, since both the second rotary shaft 61 and the first end 111 of the cable 110 are located on the second link member 40, a length L2 between the second rotary shaft 61 and the first end 111 of the cable 110 is uniformly maintained and the radius R2 of the second pulley 63 on the second link member is uniformly maintained, and thus constant torque T2 is applied to the second rotary shaft 61. Further, since both the first rotary shaft 51 and the second contact pulley 122 are located on the first link member 30, a length L2 between the first rotary shaft 51 and the second contact pulley 122 is uniformly maintained and the radius R1 of the first pulley 54 is uniformly maintained, and thus constant torque T1 is applied to the first rotary shaft 51.

Accordingly, since the constant torque T1 is applied to the first rotary shaft 51, backlash between the first drive gear 73 and the first gear part 52 may be removed and backlash between the second drive gear 83 and the second gear part 53 may be removed. Further, since the constant torque T2 is applied to the second rotary shaft 61, backlash between the third gear part 62 and the first connection gear 91 and between the second connection gear 92 and the first gear part 52 may be removed. Although a phase (or a movable angle) of the robot hand 10 is changed by an angle of nearly 180°, as shown in FIGS. 7 and 8, the backlash removal unit 100 removes backlash between the gears and thus the robot hand 10 may be precisely controlled.

Figure 9:
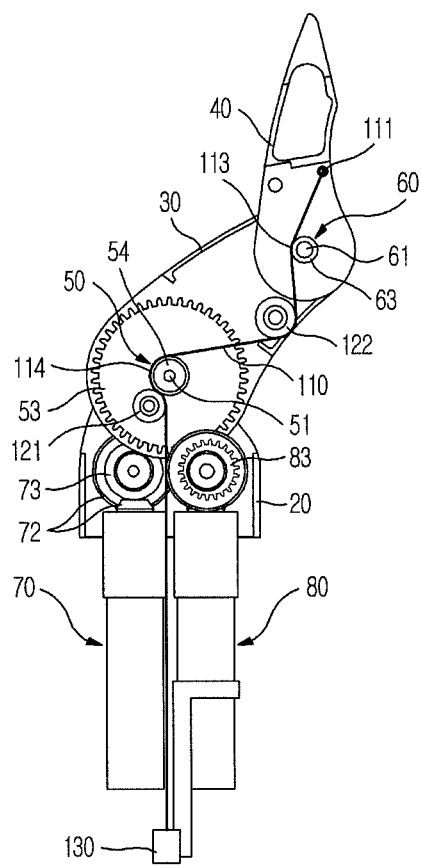
FIG. 9 is a view illustrating an operation of the robot hand by a first drive unit in accordance with an embodiment.
Figure 10:
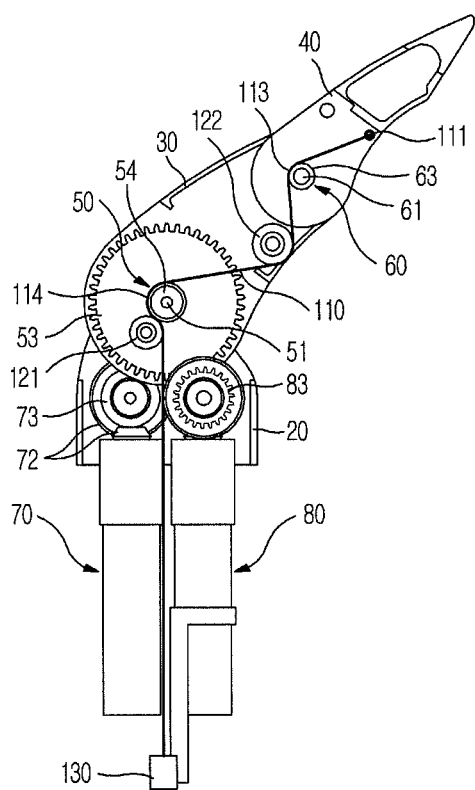
FIG. 10 is a view illustrating an operation of the robot hand by a second drive unit in accordance with an embodiment.

FIG. 9 is a view illustrating an operation of the robot hand by the first drive unit in accordance with an embodiment and FIG. 10 is a view illustrating an operation of the robot hand by the second drive unit in accordance with an embodiment.

If the first drive unit 70 is operated, as shown in FIG. 9, the first link member 30 moves relative to the frame 20 and the second link member 40 moves relative to the first link member 30. The first drive motor 71 transmits power to the first drive gear 73 through the first bevel gear 72. The first drive gear 73 transmits the power to the first gear part 51, and the first link member 30 is rotated about the first rotary shaft 51. Simultaneously, the first gear part 52 transmits the power to the third gear part 62 through the first connection gear 91 and the second connection gear 92, and the second link member 40 is rotated about the second rotary shaft 61. Here, the rotating direction of the first link member 30 and the rotating direction of the second link member 40 are opposite. Further, the constant torque T1 is applied to the first rotary shaft 51 and the constant torque T2 is applied to the second rotary shaft 62 by the backlash removal unit 100.

The first sensor part 74 of the robot hand 10 calculates drive torque supplied to the first drive gear 73 by measuring current supplied to the first drive motor 71. Such drive torque is transmitted to the first joint unit 50 and the second joint unit 60 by the gears. Further, the constant torques T1 and T2 are applied to the first joint unit 50 and the second joint unit 60 by the backlash removal unit 100. Accordingly, since the drive torque is calculated using the current value measured by the first sensor part 74 and the torques T1 and T2 applied by the backlash removal unit 100 are detected, actual torques actually applied to the first joint unit 50 and the second joint unit 60 may be calculated. That is, in the case of FIG. 9, the actual torque applied to the first joint unit 50 is easily calculated by subtracting the torque T1 applied by the backlash removal unit 100 from the drive torque corresponding to the current value measured by the first sensor part 74, and the actual torque applied to the second joint unit 60 is easily calculated by adding the torque T2 applied by the backlash removal unit 100 to the drive torque corresponding to the current value.

On the other hand, in accordance with another embodiment, if the first link member 30 and the second link member 40 are rotated in directions opposite to the directions of FIG. 9, the actual torque applied to the first joint unit 50 may be calculated by adding the torque T1 applied by the backlash removal unit 100 to the drive torque and the actual torque applied to the second joint unit 60 may be calculated by subtracting the torque T2 applied by the backlash removal unit 100 from the drive torque.

Further, if the second drive unit 80 is operated, as shown in FIG. 10, the first link member 30 moves relative to the frame 20. That is, the second drive motor 81 transmits power to the second drive gear 83 through the second bevel gear 82. The second drive gear 83 transmits the power to the second gear part 53, and the first link member 30 is rotated about the first rotary shaft 51. Here, the constant torque T1 is applied to the first rotary shaft 51 and the constant torque T2 is applied to the second rotary shaft T2 by the backlash removal unit 100.

The second sensor part 84 of the robot hand 10 calculates drive torque supplied to the second drive gear 83 by measuring current supplied to the second drive motor 81. Such drive torque is transmitted to the second gear part 53, i.e., the first joint unit 50. Further, the constant torque T1 is applied to the first joint unit 50 by the backlash removal unit 100. Accordingly, since the drive torque is calculated using the current value measured by the second sensor part 84 and the torque T1 applied by the backlash removal unit 100 is detected, actual torque actually applied to the first joint unit 50 may be calculated. That is, in the case of FIG. 10, the actual torque applied to the first joint unit 50 is easily calculated by subtracting the torque T1 applied by the backlash removal unit 100 from the drive torque corresponding to the current value measured by the second sensor part 84.

On the other hand, in accordance with another embodiment, if the first link member 30 is rotated in a direction opposite to the direction of FIG. 10, the actual torque applied to the first joint unit 50 may be calculated by adding the torque T1 applied by the backlash removal unit 100 to the drive torque.

Consequently, although the relative positions of the first link member 30 and the second link member 40 to the frame 20 are changed, since the torques T1 and T2 applied to the first joint unit 50 and the second joint unit 60 by the backlash removal unit 100 are constant, the actual torques applied to the first joint unit 50 and the second joint unit 60 may be easily and simply calculated by subtracting the torques T1 and T2 applied to the first joint unit 50 and the second joint unit 60 by the backlash removal unit 100 from the drive torques calculated through the first sensor part 74 and the second sensor part 84. Thereby, the actual torques of the respective joints of the robot hand 10 may be accurately controlled and thus movement of the respective joints of the robot hand 10 may be precisely controlled.

If the first drive unit 70 and the second drive unit 80 are properly combined, the operations shown in FIGS. 6 to 8 may be easily achieved and a robot hand 10 having other various shapes may be implemented.

Although FIGS. 1 to 10 illustrate the first link member 30 as being rotatably provided on the frame 20 and the second link member 40 as being rotatably provided on the first link member 30, the relation among the frame 20, the first link member 30 and the second link member 40 is not limited thereto. That is, in accordance another embodiment, only the first link member 30 may be rotatably provided on the frame 20, and in accordance with another embodiment, the first link member 30 may be rotatably provided on the frame 20, the second link member 40 may be rotatably provided on the first link member 30, and a third link member may be rotatably provided on the second link member 40.

As is apparent from the above description, in a robot hand in accordance with an embodiment, backlash may be removed using constant torque, and when a finger torque is measured by sensing current, error due to backlash may be prevented.

Further, drive torque to actually move a finger may be calculated by adding or subtracting torque, applied by a static load spring, from the finger torque measured by sensing current without calculation of force according to a pose of the finger.

According to an embodiment, a robot including a robot hand, or simply a robot hand, may include a computer to perform various calculations and/or measurements described herein.

According to an embodiment, a robot hand includes a frame, a first link member which moves relative to the frame, a second link member which moves relative to the first link member, a first joint unit provided between the frame and the first link member and is operable to move the first link member, a second joint unit provided between the first link member and the second link member and is operable to move the second link member, and a power transmission unit connecting the first joint unit and the second joint unit and is operable to transmit power from the first joint unit to the second joint unit. According to an embodiment, a first drive unit supplies power to the first joint unit so as to operate the first joint unit and thereby move the first link member relative to the frame, and to thereby cause the power transmission unit to operate and thereby cause power to be transmitted from the first joint unit to the second joint unit to operate the second joint unit and thereby move the second link member relative to the first link member. According to an embodiment, a backlash removal unit supplies constant torque to the first joint unit and supplies constant torque to the second joint unit, even if relative positions of the first link member and the second link member to the frame are changed as the first link member and the second link member are moved as a result of the power supplied by the first drive unit.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A robot hand comprising:
   a frame;
   a first link member which moves relative to the frame;
   a second link member which moves relative to the first link member;
   a first joint unit provided between the frame and the first link member and is operable to move the first link member;
   a second joint unit provided between the first link member and the second link member and is operable to move the second link member;
   a power transmission unit connecting the first joint unit and the second joint unit and is operable to transmit power from the first joint unit to the second joint unit;
   a first drive unit supplying power to the first joint unit so as to operate the first joint unit and thereby move the first link member relative to the frame, and to thereby cause the power transmission unit to operate and thereby cause power to be transmitted from the first joint unit to the second joint unit to operate the second joint unit and thereby move the second link member relative to the first link member; and
   a backlash removal unit supplying constant torque to the first joint unit and supplying constant torque to the second joint unit, even if relative positions of the first link member and the second link member to the frame are changed as the first link member and the second link member are moved as a result of the power supplied by the first drive unit.

2. The robot hand according to claim 1, wherein the backlash removal unit includes a cable provided with a first end fixed to the second link member and a second end located on the frame, a tension supply unit connected to the second end of the cable to supply constant tension to the cable, a first contact pulley enabling a first part of the cable to contact the first joint unit, and a second contact pulley enabling a second part of the cable to contact the second joint unit.

3. The robot hand according to claim 2, wherein:
   the first joint unit includes a first rotary shaft, a first gear part provided on the first rotary shaft, and a first pulley provided on the first rotary shaft such that the first part of the cable contacts the first pulley; and
   the second joint unit includes a second rotary shaft, a third gear part provided on the second rotary shaft, and a second pulley provided on the second rotary shaft such that the second part of the cable contacts the second pulley.

4. The robot hand according to claim 3, wherein:
the first drive unit includes a first drive motor and a first drive gear receiving power from the first drive motor; and
the first drive gear is engaged with the first gear part.

5. The robot hand according to claim 4, wherein the first drive unit further includes a first sensor part to measure current supplied to the first drive motor.

6. The robot hand according to claim 3, wherein:
the power transmission unit includes a first connection gear and a second connection gear engaged with each other; and
the first connection gear is engaged with the first gear part and the second connection gear is engaged with the third gear part.

7. The robot hand according to claim 2, wherein the tension supply unit includes a static load spring.

8. The robot hand according to claim 1, further comprising a second drive unit supplying power to the first joint unit to operate the first joint unit to thereby move the first link member relative to the frame.

9. The robot hand according to claim 8, wherein the first joint unit includes a first rotary shaft and a third gear part provided on the first rotary shaft.

10. The robot hand according to claim 9, wherein the second joint unit includes a second drive motor and a second drive gear receiving power from the second drive motor; and
the second drive gear is engaged with the third gear part.

11. The robot hand according to claim 10, wherein the second drive unit further includes a second sensor part to measure current supplied to the second drive motor.

12. A robot hand comprising:
a frame;
a link member which moves relative to the frame;
a joint unit provided between the frame and the link member and is operable to move the link member;
a drive unit supplying power to the joint unit so as to operate the joint unit and thereby move the link member; and
a backlash removal unit supplying constant torque to the joint unit, even if a relative position of the link member to the frame is changed as the link member is moved, to thereby remove backlash generated by the change in relative position,
wherein the link member rotates to thereby move relative to the frame.

13. The robot hand according to claim 12, wherein the backlash removal unit includes a cable provided with a first end fixed to the link member and a second end located on the frame, a tension supply unit connected to the second end of the cable to supply tension, and a contact pulley enabling at least a part of the cable to contact the joint unit.

14. The robot hand according to claim 13, wherein the joint unit includes a rotary shaft, a gear part provided on the rotary shaft, and a pulley provided on the rotary shaft such that the at least a part of the cable contacts the pulley.

15. The robot hand according to claim 14, wherein:
the drive unit includes a drive motor and a drive gear receiving power from the drive motor; and
the drive gear is engaged with the gear part.

16. The robot hand according to claim 14, wherein the drive unit further includes a sensor part to measure current supplied to the drive motor.

17. The robot hand according to claim 13, wherein the tension supply unit includes a static load spring.

* * * * *